United States Patent Office 2,900,387
Patented Aug. 18, 1959

2,900,387

STABILIZATION OF HETEROCYCLIC NITROGEN COMPOUNDS

Clyde W. Mertz, Bartlesville, Okla., assignor to Phillips Petroleum Company, a corporation of Delaware No Drawing. Application July 20, 1953
Serial No. 369,217

18 Claims. (Cl. 260—290)

This invention pertains to the stabilization of vinyl-substituted heterocyclic compounds having a hetero nitrogen atom. In one of its aspects the invention pertains to the stabilization of vinylpyridine compounds.

It is known that difficulties are encountered in the manufacture of vinylpyridine and other vinyl-substituted heterocyclic nitrogen compounds because of the tendency of these vinyl compounds to polymerize upon standing at room temperature and upon exposure to elevated temperatures. In the case of vinylpyridines the presence of soluble and insoluble polymers is particularly undesirable because vinylpyridine compounds are employed as monomers for use in polymerization reactions, and the like. Hence, in the preparation of vinylpyridine compounds, the steps of distillation and storage have been matters of concern.

In accordance with this invention, it is proposed to add to polymerizable vinylpyridine compounds a novel inhibiting agent or stabilizer. I with to point out that I intend that the terms "stabilizer" and "inhibiting agent," used herein, shall have essentially the same meaning and that they are used for essentially the same purpose, which is to designate the substances, disclosed herein, which prevent polymerization to an extent hereinafter described, and that these terms shall not necessarily denote a mechanism by which this is accomplished. I have discovered that readily polymerizable vinylpyridine compounds can be effectively stabilized against polymerization by adding a compound selected from the group consisting of compounds according to the formula X—S—C≡N, wherein X can be an ammonium, alkali metal, alkyl, alkenyl, mononitroalkyl, phenyl, mono-, di- or tri-nitrophenyl radical. The nitro radicals in the di- and tri-nitrophenyl substituents for X are in the 2, 4 and 6 positions. The alkyl, alkenyl and nitroalkyl radicals can have up to 12 carbon atoms. Examples of the above compounds which are effective stabilizers in accordance with my invention are ammonium thiocyanate, sodium thiocyanate, potassium thiocyanate, lithium thiocyanate, methylthiocyanate, ethylthiocyanate, propylthiocyanate, butylthiocyanate, hexylthiocyanate, octylthiocyanate, dodecylthiocyanate, isopropylthiocyanate, tert-butylthiocyanate, 2-nitro-ethylthiocyanate, ethenylthiocyanate, isopropylthiocyanate, sec-butyl-thiocyanate, tert-butylthiocyanate, 1-propenylthiocyanate, 2-butenylthiocyanate, 1-hexenylthiocyanate, 2-octenylthiocyanate, 4-decenylthiocyanate, 2-dodecenylthiocyanate, nitroethylthiocyanate, 1-nitropropylthiocyanate, 1-nitrobutylthiocyanate, 2-nitro-2-methyl-propyl-thiocyanate, 1-nitrodecylthiocyanate, 1-nitrododecylthiocyanate, phenyl thiocyanate, 2,4-dinitrophenylthiocyanate, 2-nitrophenylthiocyanate, 2,4,6-trinitrophenylthiocyanate, and the like. Although in a preferred embodiment this invention pertains to a method for treating polymerizable vinylpyridine compounds with an inhibitor selected from the above described group to stabilize the pyridine compounds at distillation temperatures as well as at room temperature and below, the process of this invention is also applicable to other vinyl substituted heterocyclic compounds having a hetero nitrogen atom.

The polymerization which is inhibited by the novel stabilizing agents disclosed herein is primarily that which forms an insoluble, hard, porous opaque material often referred to as popcorn polymer. However, polymers are also formed which are soluble in the vinylpyridine reactants and which become apparent by an increase in viscosity. As will be seen from the examples, I have found that soluble polymer formation is also inhibited by the disclosed stabilizing agents.

One group of polymerizable vinyl-substituted heterocyclic compounds containing a hetero nitrogen atom which can be stabilized in accordance with my invention is the mono- and divinylpyridines, with the vinyl group being present in any of the several positions in the pyridine nucleus. Alkyl groups can be present on the ring, or on the alpha carbon atom of the vinyl group, but the number of carbon atoms in the combined alkyl groups should generally not be greater than 12. These alkyl groups are preferably methyl and ethyl groups. Substituents attached to carbon atoms in the ring can be selected from the group consisting of hydrogen, alkyl-vinyl, and isopropenyl (alpha-methylvinyl) groups; at least one and not more than two of said groups being vinyl or alpha-methylvinyl; and the total number of carbon atoms in the alkyl groups being not greater than 12. Examples of such compounds are 2-vinylpyridine; 3-vinylpyridine; 4-vinylpyridine; 2,5-divinylpyridine; 2-methyl-5-vinylpyridine; 2-vinyl-5-ethyl-pyridine; 2,3,4, trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-6-vinylpyridine; 2-methyl-5-undecyl-4-vinylpyridine; 3-dodecyl-4,6-divinylpyridine; 2,3-dimethyl-5,6-dipentyl-4-vinylpyridine; 2-methyl-5-(alpha-methylvinyl) 3,5-di (alpha-methylvinyl)pyridine; and the like.

Other polymerizable heterocyclic compounds containing a hetero nitrogen atom included within the scope of this invention are those vinyl and alpha-methylvinyl substituted heterocyclic nitrogen compounds in which the ring structure is unsaturated, partially saturated and completely saturated. Examples include vinyl and alpha-methylvinyl substituted quinolines, isoquinolines, piperidines (hexa-hydropyridines), pyrroles, pyrrolidines, pyrrolidones, alkyl derivatives of the foregoing compounds, dihydro and tetrahydropyridines, partially hydrogenated quinolines and isoquinolines, and pyrrolines (dihydropyrroles). Examples of such compounds are 2-vinylquinoline; 8-ethyl-2-vinylquinoline; 4-hexyl-5-vinylquinoline; 1-vinylisoquinoline; 5-methyl-1-isopropenylisoquinoline; 1,8-divinylisoquinoline; vinylpyrrolidone; vinylpyrrole; vinylpiperidine; and vinylpyrrolidine and the like. Normally the vinyl substituent will be attached to a ring carbon atom. However, in compounds wherein the ring nitrogen atom is a second nitrogen atom, the vinyl group can instead be attached to this ring nitrogen atom, for example, N-vinylcarbazole and N-vinylpyrrolidone. The process of this invention is particularly applicable to organic or hydrocarbon mixtures containing substantial proportion of a vinylpyridine compound, i.e. that amount which causes difficulties due to its polymerization, e.g. over 50 percent. Examples of vinylpyridine compounds contained in such mixtures are 2-vinyl-4,6-dimethylpyridine, 2-methyl-4-vinylpyridine, 2-methyl-5-vinylpyridine, 5-ethyl-2-vinylpyridine, 5-amyl-2-vinylpyridine.

In carrying out the invention solution of the stabilizing agent in the vinylpyridine, or other heterocyclic compound containing a hetero nitrogen atom to be stabilized, can be accomplished in any suitable manner, such as by agitating or stirring the mixture containing the stabilizing agent, or merely by allowing the mixture to stand. Ultimately, the decision on what concentration of the stabilizing agent to use will depend on variable factors, such as the temperature and duration of time at a given temperature at which the heterocyclic compound containing a hetero nitrogen atom will be maintained when inhibition of polymer formation is desired, and economic considerations. In practice a range of concentration from 0.05 percent to 1.0 percent, or more, by weight of the stabilizing compounds disclosed herein will be employed, preferably from 0.1 percent to 0.5 percent, all percentages being based on the weight of the heterocyclic compound containing a hetero nitrogen atom to be stabilized. Furthermore, the amount will depend on which particular heterocyclic compound containing a hetero nitrogen atom is concerned.

An important advantage in the use of the stabilizing compounds disclosed herein is the fact that traces of the inhibitors disclosed herein can be readily detected by the intense red color that is formed on a crystal of ferric chloride when wetted with a sample of the polymerizable vinylpyridine compound containing the stabilizers disclosed herein, due to the presence of the thiocyanate group.

EXAMPLE I

In order to obtain a sample of 2-methyl-5-vinylpyridine which would polymerize rapidly and consistently, a sample of 95 percent by weight 2-methyl-5-vinylpyridine was treated in the following manner. A portion of the 95 percent by weight 2-methyl-5-vinylpyridine was vacuum distilled at approximately 50 millimeters pressure and a kettle temperature of not above 200° F. Approximately 1 percent by weight of the heavy material remaining in the kettle from this vacuum distillation was added to the sample of 95 percent by weight 2-methyl-5-vinylpyridine to be tested for polymerization in the presence of the inhibitor. The added heavy material upon testing was found to comprise divinylpyridine which is believed to be a precursor of polymerization in heterocyclic nitrogen compounds. A small seed of insoluble 2-methyl-5-vinylpyridine (popcorn polymer) was also added to the test sample and the sample was maintained at approximately 190° F. for the indicated time interval. The results in the absence and in the presence of ammonium thiocyanate are shown below in Table I.

*Table 1*

| Sample Description | Observations |
|---|---|
| (1) Control sample (no inhibitor) | All popcorn polymer in 10 to 18 hours. |
| (2) Sample plus 0.1 weight percent ammonium thiocyanate. | All popcorn polymer in 72 hours. |
| (3) Sample plus 0.2 weight percent ammonium thiocyanate. | Fluid, no popcorn polymer in 12 days. |
| (4) Sample plus 0.5 weight percent ammonium thiocyanate. | Do. |
| (5) Sample plus 1.0 weight percent ammonium thiocyanate. | Fluid, no popcorn polymer in 16 days. |

A sample of 2-methyl-5-vinylpyridine prepared as indicated above was tested in the absence and in the presence of 2,4-dinitrophenylthiocyanate and the results are shown below in Table 2.

*Table 2*

| Sample Description | Observations |
|---|---|
| (1) Control sample (no inhibitor) | All popcorn polymer in 10 to 18 hours. |
| (2) Sample plus 0.1 weight percent 2,4-dinitrophenyl-thiocyanate. | Very fluid, no popcorn polymer in 10 days. |
| (3) Sample plus 0.2 weight percent 2,4-dinitrophenylthiocyanate. | Very fluid, no popcorn polymer in 12 days. |
| (4) Sample plus 0.5 weight percent 2,4-dinitrophenylthiocyanate. | Do. |
| (5) Sample plus 1.0 weight percent 2,4-dinitrophenylthiocyanate. | Very fluid, no popcorn polymer in 16 days. |

From the foregoing it is apparent that the stabilizing compounds disclosed herein are effective inhibitors of insoluble, or popcorn, polymer formation when heterocyclic compounds having a hetero nitrogen atom are maintained at elevated temperatures, and most remarkably, even when the test solutions are prepared in a manner to make the test conditions most severe. Also, it can be seen that these stabilizers inhibit the formation of soluble polymers since the treated 2-methyl-5-vinylpyridine was observed to be fluid after 12 days. As is well known in the art soluble polymer formation is indicated by an increase in viscosity, progressively, until a sample can be changed into the solid state due to the formation of soluble polymers.

This invention, accordingly, concerns a method for treating polymerizable vinylpyridine compounds with certain novel stabilizing compounds to inhibit polymerization at temperatures up to 400° F. as well as at room temperature or below.

In accordance with this invention organic mixtures containing a vinylpyridine, i.e., a vinylpyridine mixed with other organic heterocyclic nitrogen compounds, or pyridine compounds, or purified vinylpyridines, can be stored over long periods of time preferably at room temperature. Likewise, when it is desired to separate a particular vinylpyridine compound from other organic compounds, the stabilized solution can be distilled, preferably at reduced pressure, without any substantial loss of product, the stabilizing agent serving to inhibit polymerization of the vinylpyridine compounds during the process. The instant invention is particularly applicable to mixtures of heterocyclic compounds having a hetero nitrogen atom, containing a substantial proportion of at least one vinyl-substituted heterocyclic compound having a hetero nitrogen atom, i.e., sufficient to cause difficulty due to polymer formation during storage and distillation.

In the practice of this invention the polymer formation inhibiting agents disclosed herein can be used, for example, in the following manner. In the preparation of 2-methyl-5-vinylpyridine from 2-methyl-5-ethylpyridine by dehydrogenation, for example by the method disclosed in the copending application of John E. Mahan, Serial No. 244,469, filed on August 30, 1951, the principal separation is a combined steam and vacuum distillation of the effluent from said dehydrogenation to make a separation between 2-methyl-5-ethylpyridine and 2-methyl-5-vinylpyridine. This is a difficult separation, due to the proximity of the boiling points of the stated components, and because considerable polymerization of the 2-methyl-5-vinylpyridine in said effluent occurs, since said effluent is subjected to heat in the range of 180° to 220° F. during said distillation. After a short period of time operation of the distillation column becomes impossible because of an insoluble polymer which forms in the lower part of the column and in the kettle. However, by the use of the stabilizing compounds disclosed herein in accordance with this invention, shut-downs due to polymerization of the 2-methyl-5-vinylpyridine are eliminated.

I have found that when the object is merely to stabilize the distillate from the above described distillation against the formation of insoluble polymer, the disclosed inhibiting agents can be employed in the lowest proportion which will desirably inhibit the formation of insoluble polymer. For such purpose the feed to the distillation column can be treated with from 0.1 percent to 0.5 percent by weight of the inhibiting agent, based on the weight of the vinyl-substituted heterocyclic compound having a hetero nitrogen atom. In many instances, when the concentration of the disclosed inhibiting agents used is from 0.1 to 1.0 percent by weight, or more, based on the weight of the vinyl-substituted heterocyclic compound having a hetero nitrogen atom, the formation of soluble polymer is inhibited during distillation as well as the formation of insoluble polymer. It is to be noted that the inhibiting agents disclosed herein can be added directly to the reflux of the distillation column, rather than to the feed mixture, in an amount sufficient to stabilize the vinylpyridines depending on operating conditions then being utilized, and in many cases it will be found that a smaller quantity of inhibiting agent is required to produce a stabilized product when this method is followed than when the inhibiting agents are added to the feed mixture.

It will be understood that the foregoing disclosure is illustrative and that other embodiments within the scope of the invention will occur to those skilled in the art. Those skilled in the art will appreciate, for instance, that for the purposes of this invention, vinyl-substituted heterocyclic compounds having a hetero nitrogen atom further substitued with non-interfering groups, for example, halo-, nitro, amino-, hydroxyl-, and carboxyl-, are the same as non-substituted vinyl heterocyclic compounds having a hetero nitrogen atom.

I claim:

1. In a process for preparing 2-methyl-5-vinylpyridine comprising the dehydrogenation of 2-methyl-5-ethylpyridine and the fractional distillation of the resulting effluent from said dehydrogenation, a method for inhibiting polymerization of said 2-methyl-5-vinylpyridine during said fractional distillation which comprises introducing ammonium thiocyanate to said effluent in an amount sufficient to inhibit said polymerization.

2. A method for inhibiting the polymerization of heterocyclic nitrogen compounds selected from the group consisting of compounds having the general formula

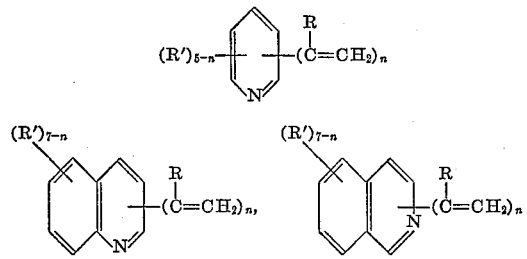

wherein $n$ is an integer selected from the group consisting of 1 and 2, R is selected from the group consisting of H, $CH_3$, $C_2H_5$, and each R' is individually selected from the group consisting of H and an alkyl group, not more than 12 carbon atoms being present in the total of said R' groups, by introducing into said heterocyclic nitrogen compounds an inhibiting amount of a compound selected from the group consisting of compounds having the general formula

X—S—C≡N wherein X is selected from the group consisting of ammonium, alkali metal, alkyl, alkenyl, mononitroalkyl, phenyl, and nitrophenyl radicals, said alkyl, alkenyl and mononitroalkyl radicals each having up to 12 carbon atoms, and said nitrophenyl radical being selected from the group consisting of mononitrophenyl, di-nitrophenyl and tri-nitrophenyl radicals with the nitro radicals being limited to the 2, 4 and 6 positions on the phenyl radical.

3. The method of claim 2 wherein the inhibiting agent is 2,4-dinitrophenylthiocyanate.

4. The method of claim 2 wherein the inhibiting agent is ammonium thiocyanate.

5. The method of claim 2 wherein the heterocyclic nitrogen compound is 2-methyl-5-vinylpyridine and the inhibitor is ammonium thiocyanate.

6. A continuous method for inhibiting, during distillation, the polymerization of heterocyclic nitrogen compounds selected from the group consisting of compounds having the general formula

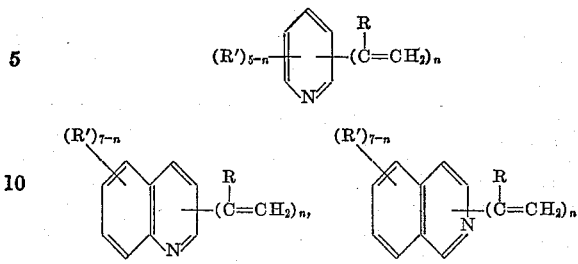

wherein $n$ is an integer selected from the group consisting of 1 and 2, R is selected from the group consisting of H, $CH_3$, $C_2H_5$, and each R' is individually selected from the group consisting of H and an alkyl group, not more than 12 carbon atoms being present in the total of said R' groups, said heterocyclic nitrogen compounds containing a substantial proportion of vinylpyridine compounds by introducing into the reflux, during distillation, from about 0.05 to about 1.0 weight percent, based on said heterocyclic nitrogen compounds, of 2,4-dinitrophenylthiocyanate, thus effecting said distillation in the presence of said 2,4-dinitrophenylthiocyanate.

7. A polymerizable heterocyclic nitrogen base selected from the group consisting of compounds having the general formula

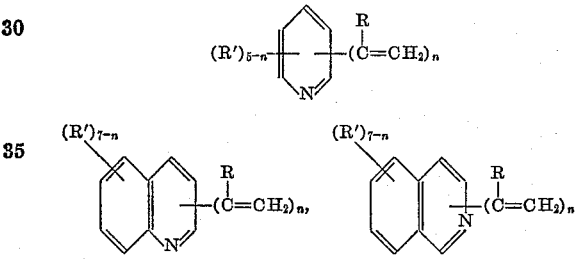

wherein $n$ is an integer selected from the group consisting of 1 and 2, R is selected from the group consisting of H, $CH_3$, $C_2H_5$, and each R' is individually selected from the group consisting of H and an alkyl group, not more than 12 carbon atoms being present in the total of said R' groups, stabilized by the addition of a stabilizing amount of a compound according to the formula

X—S—C≡N wherein X is selected from the group consisting of ammonium, alkali metal, alkyl, alkenyl, mononitroalkyl, phenyl, and nitrophenyl radicals, said alkyl, alkenyl and mononitroalkyl radicals each having up to 12 carbon atoms, and said nitrophenyl radical being selected from the group consisting of mononitrophenyl, dinitrophenyl and trinitrophenyl radicals with the nitro radicals being limited to the 2, 4 and 6 positions on the phenyl radical.

8. The composition of claim 7 wherein the stabilizer is ammonium thiocyanate.

9. The composition of claim 7 wherein the stabilizer is 2,4-dinitrophenyl thiocyanate.

10. A polymerizable vinylpyridine stabilized with about 0.05 to about 1.0 weight percent of a compound according to the formula

X—S—C≡N wherein X is selected from the group consisting of ammonium, alkali metal, alkyl, alkenyl, mononitroalkyl, phenyl, and nitrophenyl radicals, said alkyl, alkenyl and monoitroalkyl radicals each having up to 12 carbon atoms, and said nitrophenyl radical being selected from the group consisting of mononitrophenyl, dinitrophenyl and tri-nitrophenyl radicals with the nitro radicals being limited to the 2, 4 and 6 positions on the phenyl radical.

11. The composition of claim 10 wherein the stabilizer is ammonium thiocyanate.

12. The composition of claim 10 wherein the stabilizer is 2,4-dinitrophenyl thiocyanate.

13. 2-methyl-5-vinylpyridine stabilized with about 0.05 to about 1.0 weight percent of ammonium thiocyanate.

14. 2-methly-5-vinylpyridine stabilized with about 0.05 to about 1.0 weight percent of 2,4-dinitrophenyl thiocyanate.

15. A method which comprises inhibiting a vinylpyridine compound against popcorn polymer formation during distillation, said vinylpyridine compound being contained in a substantially non-aqueous medium, by introducing into said vinylpyridine an amount sufficient to inhibit popcorn polymer formation of a compound selected from the group consisting of compounds having the general formula $$X-S-C\equiv N$$

wherein X is selected from the group consisting of ammonium, alkali metal, alkyl, alkenyl, mono-nitroalkyl, phenyl, and nitrophenyl radicals, said alkyl, alkenyl, and mono-nitroalkyl radicals each having up to 12 carbon atoms, and said nitrophenyl radical being selected from the group consisting of mono-nitrophenyl, di-nitrophenyl and tri-nitrophenyl radicals with the nitro radicals being limited to the 2, 4 and 6 positions on the phenyl radical.

16. The method of claim 15 wherein the inhibitor is from about 0.05 to about 1.0 weight percent, based on said vinylpyridine compound of 2,4-dinitrophenylthiocyanate.

17. The method of claim 15 wherein the inhibitor is from about 0.05 to about 1.0 weight percent, based on said vinylpyridine compound, of ammonium thiocyanate.

18. The method of claim 2 wherein the heterocyclic nitrogen compound is 2-methyl-5-vinylpyridine and the inhibitor is 2,4-dinitrophenylthiocyanate.

References Cited in the file of this patent

UNITED STATES PATENTS 2,547,194  Zienty _____ Apr. 3, 1951

OTHER REFERENCES

Dunbrook et al.: Official Gabette, vol. 644, pp. 623–4 (1951).

Laidler: Chemical Kinetics, McGraw-Hill Book Co., 1950, pp. 345–364.

Frank et al.: J. Am. Chem. Soc., vol. 68, p. 908 (1946).